(12) United States Patent
Miura et al.

(10) Patent No.: US 11,733,618 B2
(45) Date of Patent: Aug. 22, 2023

(54) ELECTROSTATIC IMAGE DEVELOPING TONER, ELECTROSTATIC IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Satoshi Miura, Kanagawa (JP); Shintaro Anno, Kanagawa (JP); Daisuke Noguchi, Kanagawa (JP); Yoshimasa Fujihara, Kanagawa (JP); Atsushi Sugawara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 26 days.

(21) Appl. No.: 17/139,050

(22) Filed: Dec. 31, 2020

(65) Prior Publication Data

US 2022/0091524 A1 Mar. 24, 2022

(30) Foreign Application Priority Data

Sep. 23, 2020 (JP) ................... 2020-159122

(51) Int. Cl.
| | | |
|---|---|---|
| *G03G 9/087* | (2006.01) | |
| *G03G 15/08* | (2006.01) | |
| *G03G 21/18* | (2006.01) | |
| *C08G 63/547* | (2006.01) | |
| *C08G 63/16* | (2006.01) | |

(Continued)

(52) U.S. Cl.
CPC ....... *G03G 9/08755* (2013.01); *C08F 212/08* (2013.01); *C08G 63/16* (2013.01); *C08G 63/547* (2013.01); *G03G 9/0821* (2013.01); *G03G 9/08711* (2013.01); *G03G 9/091* (2013.01); *G03G 9/09733* (2013.01); *G03G 15/0865* (2013.01); *G03G 21/1814* (2013.01)

(58) Field of Classification Search
CPC ............. G03G 9/08755; G03G 9/0821; G03G 9/08711; G03G 9/091; G03G 9/09733
See application file for complete search history.

(56) References Cited

U.S. PATENT DOCUMENTS 10,146,147 B2 * 12/2018 Kayamori .............. G03G 9/092
2003/0039910 A1 * 2/2003 Shirai .................... G03G 9/081
 430/109.4
2017/0329246 A1 * 11/2017 Yamawaki ......... G03G 9/08711

FOREIGN PATENT DOCUMENTS

| JP | 4657932 B2 | 3/2011 |
| JP | 2014006339 A * | 1/2014 |

(Continued)

OTHER PUBLICATIONS

Machine translation of the description of publication # JP-2014006339-A (Year: 2014).*

*Primary Examiner* — Peter L Vajda
*Assistant Examiner* — Boone Alexander Evans
(74) *Attorney, Agent, or Firm* — Sughrue Mion, PLLC

(57) ABSTRACT

An electrostatic image developing toner includes an amorphous polyester resin, a crystalline polyester resin, and C.I. Pigment Red 57:1, wherein a Net intensity $N_{Mg}$ of an Mg element, the Net intensity $N_{Mg}$ of being determined by X-ray fluorescence analysis, is 0.10 kcps or more and 0.40 kcps or less.

18 Claims, 3 Drawing Sheets

(51) Int. Cl.
*C08F 212/08* (2006.01)
*G03G 9/09* (2006.01)
*G03G 9/08* (2006.01)
*G03G 9/097* (2006.01)

(56) References Cited

FOREIGN PATENT DOCUMENTS

| | | |
|---|---|---|
| JP | 2017-003990 A | 1/2017 |
| JP | 2019-040024 A | 3/2019 |

* cited by examiner

ELECTROSTATIC IMAGE DEVELOPING TONER, ELECTROSTATIC IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2020-159122 filed Sep. 23, 2020.

BACKGROUND

(i) Technical Field

The present disclosure relates to an electrostatic image developing toner, an electrostatic image developer, a toner cartridge, a process cartridge, an image forming apparatus, and an image forming method.

(ii) Related Art

Japanese Patent No. 4657932 discloses an image forming toner that includes a binder resin and colorants, wherein 50% to 100% by weight of the binder resin is a polyester resin, the colorants are masterbatches produced by kneading a mixture of a pigment surface-treated into acidic, a dispersant, and a binder resin, and the dispersant has an acid value of 1 to 30 mgKOH/g or less and an amine value of 1 or more and 100 or less. One of the colorants is C.I. Pigment Red 57:1.

Japanese Laid Open Patent Application Publication No. 2019-040024 discloses a toner that includes toner particles constituted by a toner core including a material produced by melt-kneading an amorphous resin with a crystalline resin and a shell layer including a thermosetting resin, wherein the melt-kneaded material includes plural crystalline resin domains and the proportion of specific crystalline resin domains having a minor axis length of 50 nm or more and 200 nm or less and an aspect ratio of 4.0 or more and 20.0 or less to all the crystalline resin domains is 80% or more by number.

Japanese Laid Open Patent Application Publication No. 2017-003990 discloses a toner including toner particles including an amorphous polyester resin, a crystalline polyester resin, and a wax, wherein domains composed of the wax and crystals of the crystalline polyester resin are present, the proportion of the area of the wax domains to the cross-sectional area of the toner particle is 0.5% or more and 8.0% or less, the proportion of the area of the crystals of the crystalline polyester resin to the cross-sectional area of the toner particle is 0.5% or more and 8.0% or less, the wax domains have a number average diameter of 60 nm or more and 240 nm or less, the crystals of the crystalline polyester resin have an aspect ratio of 5.0 or more and 25.0 or less, and the number average major axis length of the crystals of the crystalline polyester resin is 0.8 times or more and 2.0 times or less the number average diameter of the wax domains.

SUMMARY

Aspects of non-limiting embodiments of the present disclosure relate to an electrostatic image developing toner including an amorphous polyester resin, a crystalline polyester resin, and C.I. Pigment Red 57:1, the electrostatic image developing toner being excellent in terms of the quality of transfer to recording media having a relatively high water content, compared with an electrostatic image developing toner wherein the Net intensity $N_{Mg}$ of Mg element determined by X-ray fluorescence analysis is less than 0.10 kcps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developing toner including an amorphous polyester resin, a crystalline polyester resin, and C.I. Pigment Red 57:1, wherein a Net intensity $N_{Mg}$ of an Mg element, the Net intensity $N_{Mg}$ being determined by X-ray fluorescence analysis, is 0.10 kcps or more and 0.40 kcps or less.

BRIEF DESCRIPTION OF THE DRAWINGS

Exemplary embodiments of the present disclosure will be described in detail based on the following figures, wherein.

DETAILED DESCRIPTION

Figure 1:
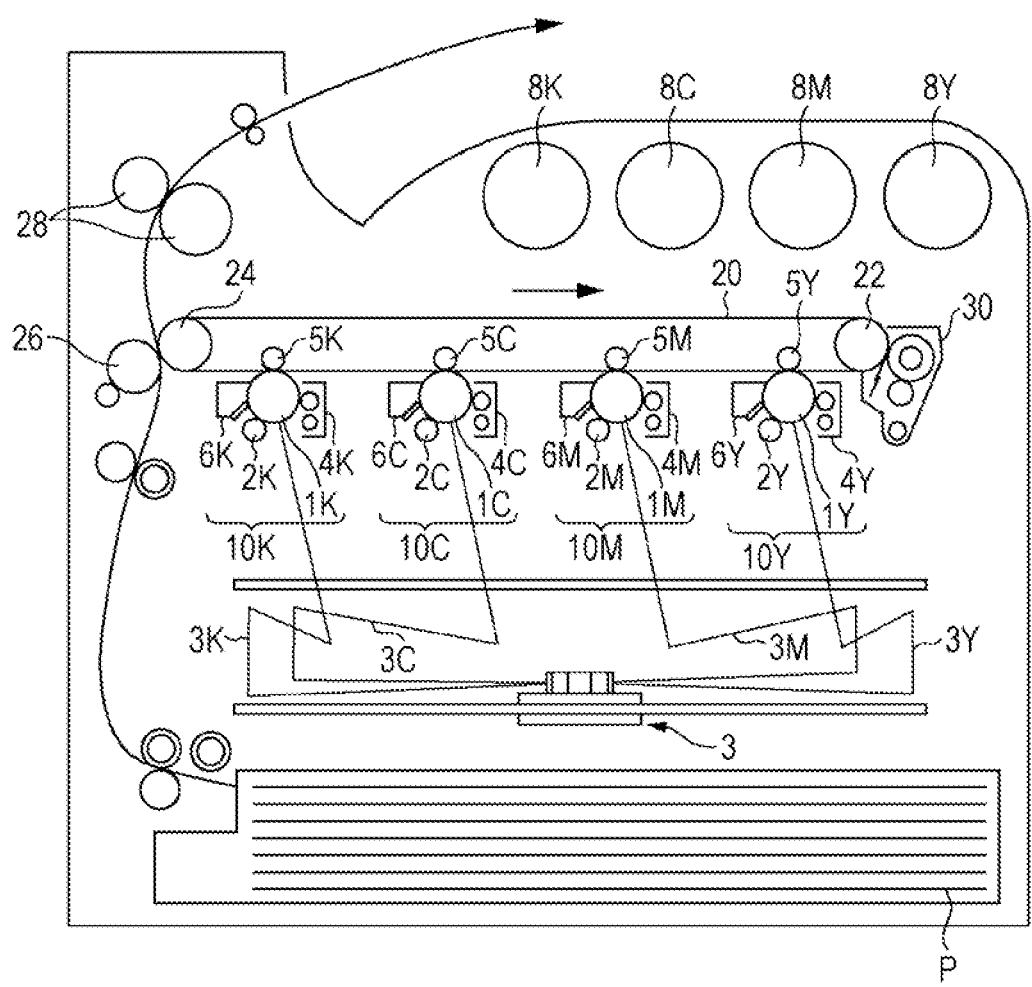
FIG. 1 is a schematic diagram illustrating an example of an image forming apparatus according to an exemplary embodiment.

An exemplary embodiment of the present disclosure is described below. The following description and Examples below are intended to be illustrative of the exemplary embodiment and not restrictive of the scope of the exemplary embodiment.

In the present disclosure, a numerical range expressed using "to" means the range specified by the minimum and maximum described before and after "to", respectively.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

The term "step" used herein refers not only to an individual step but also to a step that is not distinguishable from other steps but achieves the intended purpose of the step.

In the present disclosure, when an exemplary embodiment is described with reference to a drawing, the structure of the exemplary embodiment is not limited to the structure illustrated in the drawing. The sizes of the members illustrated in the attached drawings are conceptual and do not limit the relative relationship among the sizes of the members.

Each of the components described in the present disclosure may include plural types of substances that correspond to the component. In the present disclosure, in the case where a composition includes plural substances that correspond to a component of the composition, the content of the component in the composition is the total content of the plural substances in the composition unless otherwise specified.

In the present disclosure, the number of types of particles that correspond to a component may be two or more.

In the case where a composition includes plural types of particles that correspond to a component of the composition, the particle size of the component is the particle size of a mixture of the plural types of particles included in the composition unless otherwise specified.

In the present disclosure, an electrostatic image developing toner may be referred to simply as "toner", and an electrostatic image developer may be referred to simply as "developer".

Electrostatic Image Developing Toner

A toner according to the exemplary embodiment includes an amorphous polyester resin, a crystalline polyester resin, and C.I. Pigment Red 57:1, wherein the Net intensity $N_{Mg}$ of Mg element determined by X-ray fluorescence analysis is 0.10 kcps or more and 0.40 kcps or less.

The abbreviation "C.I." used herein stands for "Colour Index". The structural formula of C.I. Pigment Red 57:1 is described below.

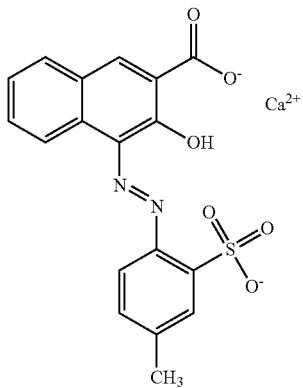 [SMILES: Cc1ccc(/N=N/c2c(O)c(C(=O)[O-])cc3ccccc23)c(S(=O)(=O)[O-])c1 ; [Ca+2]]

The color of the toner according to the exemplary embodiment is not limited. An example of the toner according to the exemplary embodiment is a magenta toner.

The toner according to the exemplary embodiment may be excellent in terms of the quality of transfer to recording media having a relatively high water content. The mechanisms are presumably as follows.

In the case where toner particles are produced in an aqueous medium, C.I. Pigment Red 57:1, which is compatible with water, is likely to be in the vicinity of the surfaces of the toner particles. When C.I. Pigment Red 57:1 is present in the surfaces of the toner particles, the toner is prone to charge leakage and transfer failure may occur consequently. The transfer failure caused due to the charge leakage from the toner becomes apparent when an image is formed on a recording medium having a relatively high water content (e.g., embossed paper).

It is considered that, in contrast, when Mg ions are present in the production of toner particles, the Ca ions constituting C.I. Pigment Red 57:1 repel the Mg ions and C.I. Pigment Red 57:1 is consequently dispersed inside the toner particles. This may reduce the amount of C.I. Pigment Red 57:1 present in the surfaces of the toner particles in a relative manner, limit the charge leakage from the toner, and accordingly improve transfer quality.

If the Net intensity $N_{Mg}$ of an Mg element in the toner is less than 0.1 kcps, that is, the amount of Mg ions present in the production of toner particles is small, the above-described action of the Mg ions may be at an insufficient level and the toner may be poor in terms of transfer quality. From the above viewpoint, the Net intensity $N_{Mg}$ of an Mg element is 0.10 kcps or more, is preferably 0.15 kcps or more, and is more preferably 0.20 kcps or more.

If the Net intensity $N_{Mg}$ of an Mg element in the toner is more than 0.4 kcps, the amount of electric charge of the toner may be excessively large and the transfer failure may be caused due to the charge leakage from the toner. From the above viewpoint, the Net intensity $N_{Mg}$ of an Mg element is 0.40 kcps or less, is preferably 0.35 kcps or less, and is more preferably 0.30 kcps or less.

Since the toner according to the exemplary embodiment includes C.I. Pigment Red 57:1, it contains Ca ions constituting C.I. Pigment Red 57:1. The Net intensity $N_{Ca}$ of a Ca element in the toner according to the exemplary embodiment which is determined by X-ray fluorescence analysis is preferably, but not limited to, 1.00 kcps or more and 3.00 kcps or less, is more preferably 1.20 kcps or more and 2.50 kcps or less, and is further preferably 1.50 kcps or more and 2.00 kcps or less.

The Net intensity $N_{Cl}$ of a Cl element in the toner according to the exemplary embodiment which is determined by X-ray fluorescence analysis may be 0.50 kcps or more and 2.00 kcps or less in order to enhance the quality of transfer to recording media having a relatively high water content. The Cl ions present in the toner interact electrostatically with the Ca ions constituting C.I. Pigment Red 57:1 to suppress the migration of C.I. Pigment Red 57:1 toward the surfaces of the toner particles. However, if the amount of Cl ions is excessively large, transfer failure may occur. From the above viewpoint, the Net intensity $N_{Cl}$ of a Cl element in the toner according to the exemplary embodiment is preferably 0.50 kcps or more and 2.00 kcps or less, is more preferably 0.70 kcps or more and 1.80 kcps or less, and is further preferably 1.00 kcps or more and 1.50 kcps or less.

The Net intensities $N_{Ca}$, $N_{Mg}$, and $N_{Cl}$ of Ca, Mg, and Cl elements in the toner according to the exemplary embodiment preferably satisfy $0.50 \leq (N_{Mg}+N_{Cl})/N_{Ca} \leq 1.50$, more preferably satisfy $0.80 \leq (N_{Mg}+N_{Cl})/N_{Ca} \leq 1.30$, and further preferably satisfy $0.90 \leq (N_{Mg}+N_{Cl})/N_{Ca} \leq 1.20$ in order to enhance the quality of transfer to recording media having a relatively high water content.

The Net intensities $N_{Ca}$, $N_{Mg}$, and $N_{Cl}$ of Ca, Mg, and Cl elements may be measured by the following method.

About 5 g of the toner (when the toner includes an external additive, the weight of the external additive is included in the calculation) is compressed at a load of 10 t for 60 seconds with a compression molding machine to form a disc having a diameter of 50 mm and a thickness of 2 mm. Using the disc as an sample, a qualitative and quantitative elemental analysis is conducted under the following conditions with a scanning X-ray fluorescence analyzer "ZSX Primus II" produced by Rigaku Corporation in order to determine the Net intensities (unit: kilo counts per second, kcps) of Ca, Mg, and Cl elements.

Tube voltage: 40 kV
Tube current: 75 mA
Anticathode: rhodium
Measurement time: 10 minutes
Analysis size: diameter of 10 mm The Mg and Cl ions may be added to the toner by, for example, using magnesium chloride in the production of toner particles.

Details of the toner according to the exemplary embodiment are described below.

The toner according to the exemplary embodiment includes toner particles and, as needed, an external additive.

Toner Particles

The toner particles include, for example, a binder resin and may optionally include a colorant, a release agent, and other additives.

Binder Resin

The binder resin includes at least an amorphous polyester resin and a crystalline polyester resin.

The term "crystalline polyester resin" used herein refers to a polyester resin that, in thermal analysis using differential scanning calorimetry (DSC), exhibits a distinct endothermic peak instead of step-like endothermic change and specifically refers to a polyester resin that exhibits an endothermic peak with a half-width of 10° C. or less at a heating rate of 10° C./min.

On the other hand, the term "amorphous polyester resin" used herein refers to a polyester resin that exhibits an endothermic peak with a half-width of more than 10° C. at a heating rate of 10° C./min, a polyester resin that exhibits step-like endothermic change, or a polyester resin that does not exhibit a distinct endothermic peak.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The glass transition temperature Tg of the amorphous polyester resin is preferably 50° C. or more and 80° C. or less and is more preferably 50° C. or more and 65° C. or less.

The glass transition temperature of the amorphous polyester resin is determined from a differential scanning calorimetry (DSC) curve obtained by DSC. More specifically, the glass transition temperature of the amorphous polyester resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the amorphous polyester resin is preferably 5,000 or more and 1,000,000 or less and is more preferably 7,000 or more and 500,000 or less. The number average molecular weight Mn of the amorphous polyester resin may be 2,000 or more and 100,000 or less. The molecular weight distribution index Mw/Mn of the amorphous polyester resin is preferably 1.5 or more and 100 or less and is more preferably 2 or more and 60 or less.

The weight average molecular weight and number average molecular weight of the amorphous polyester resin are determined by gel permeation chromatography (GPC). Specifically, the molecular weights of the amorphous polyester resin are determined by GPC using a "HLC-8120GPC" produced by Tosoh Corporation as measuring equipment, a column "TSKgel SuperHM-M (15 cm)" produced by Tosoh Corporation, and a tetrahydrofuran (THF) solvent. The weight average molecular weight and number average molecular weight of the amorphous polyester resin are determined on the basis of the results of the measurement using a molecular-weight calibration curve based on monodisperse polystyrene standard samples.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed. In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where the monomers used in the copolymerization reaction have low miscibility with each other, a condensation reaction of the monomers with an acid or alcohol that is to undergo a polycondensation reaction with the monomers may be performed in advance and subsequently polycondensation of the resulting polymers with the other components may be performed.

The amorphous polyester resin may be a modified amorphous polyester resin as well as an unmodified amorphous polyester resin. The modified amorphous polyester resin is an amorphous polyester resin including a bond other than an ester bond or an amorphous polyester resin including a resin component other than a polyester, the resin component being bonded to the amorphous polyester resin with a covalent bond, an ionic bond, or the like. Examples of the modified amorphous polyester resin include a terminal-modified amorphous polyester resin produced by reacting an amorphous polyester resin having a functional group, such as an isocyanate group, introduced at the terminal with an active hydrogen compound.

The proportion of the amorphous polyester resin in the entire binder resin is preferably 60% by mass or more and 98% by mass or less, is more preferably 65% by mass or more and 95% by mass or less, and is further preferably 70% by mass or more and 90% by mass or less.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from linear aliphatic polymerizable monomers may be used as a crystalline polyester resin instead of a condensation polymer prepared from polymerizable monomers having an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2,6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols.

Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The melting temperature of the crystalline polyester resin is preferably 50° C. or more and 100° C. or less, is more preferably 55° C. or more and 90° C. or less, and is further preferably 60° C. or more and 85° C. or less.

The melting temperature of the crystalline polyester resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline polyester resin may have a weight average molecular weight Mw of 6,000 or more and 35,000 or less.

The crystalline polyester resin may be produced by any suitable method known in the related art similarly to, for example, the amorphous polyester resin.

The crystalline polyester resin may be a polymer of an α,ω-linear aliphatic dicarboxylic acid with an α,ω-linear aliphatic diol in order to readily form the crystal structure and enhance compatibility with the amorphous polyester resin.

The α,ω-linear aliphatic dicarboxylic acid may be an α,ω-linear aliphatic dicarboxylic acid that includes two carboxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic dicarboxylic acid include succinic acid, glutaric acid, adipic acid, 1,6-hexanedicarboxylic acid (common name: suberic acid), 1,7-heptanedicarboxylic acid (common name: azelaic acid), 1,8-octanedicarboxylic acid (common name: sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferable.

The above α,ω-linear aliphatic dicarboxylic acids may be used alone or in combination of two or more.

The α,ω-linear aliphatic diol may be an α,ω-linear aliphatic diol that includes two hydroxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The above α,ω-linear aliphatic diols may be used alone or in combination of two or more.

The polymer of the α,ω-linear aliphatic dicarboxylic acid with the α,ω-linear aliphatic diol may be a polymer of at least one dicarboxylic acid selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid with at least one diol selected from the group consisting of 1,6-hexanediol, 1,7-heptanediol, 1,8-octanediol, 1,9-nonanediol, and 1,10-decanediol, in order to readily form a crystal structure and enhance compatibility with the amorphous polyester resin.

The proportion of the crystalline polyester resin in the entire binder resin is preferably 1% by mass or more and 20% by mass or less, is more preferably 2% by mass or more and 15% by mass or less, and is further preferably 3% by mass or more and 10% by mass or less.

Styrene Acrylic Resin

Examples of the binder resin include a styrene acrylic resin. The styrene acrylic resin may be an amorphous resin.

Examples of the styrene-based monomer constituting the styrene acrylic resin include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The above styrene-based monomers may be used alone or in combination of two or more.

Examples of the (meth)acryl-based monomer constituting the styrene acrylic resin include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The above (meth)acryl-based monomers may be used alone or in combination of two or more. The term "(meth)acryl" used herein refers to both "acryl" and "methacryl".

The polymerization ratio between the styrene-based monomer and the (meth)acryl-based monomer, that is, Styrene-based monomer:(Meth)acryl-based monomer, may be 70:30 to 95:5 by mass.

The styrene acrylic resin may include a crosslinked structure. The styrene acrylic resin including a crosslinked structure may be produced by, for example, copolymerization of the styrene-based monomer, the (meth)acryl-based monomer, and a crosslinkable monomer. The crosslinkable monomer may be, but not limited to, a difunctional or higher (meth)acrylate.

The method for preparing the styrene acrylic resin is not limited. For example, solution polymerization, precipitation polymerization, suspension polymerization, bulk polymerization, and emulsion polymerization may be used. The polymerization reaction may be conducted by any suitable process known in the related art, such as a batch process, a semi-continuous process, or a continuous process.

The proportion of the styrene acrylic resin in the entire binder resin is preferably 0% by mass or more and 20% by mass or less, is more preferably 1% by mass or more and 15% by mass or less, and is further preferably 2% by mass or more and 10% by mass or less.

Other Binder Resin

Examples of the other binder resin include homopolymers of the following monomers and copolymers of two or more monomers selected from the following monomers: ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the other binder resin further include non-vinyl resins, such as epoxy resins, polyurethane resins, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The above binder resins may be used alone or in combination of two or more.

The content of the binder resin in the entire toner particles is preferably 40% by mass or more and 95% by mass or less, is more preferably 50% by mass or more and 90% by mass or less, and is further preferably 60% by mass or more and 85% by mass or less.

Colorant

The toner according to the exemplary embodiment includes C.I. Pigment Red 57:1. The toner according to the exemplary embodiment may include a colorant other than C.I. Pigment Red 57:1. Examples of the other colorant include pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes. The above colorants may be used alone or in combination of two or more.

The colorant may optionally be subjected to a surface treatment and may be used in combination with a dispersant. Plural types of colorants may be used in combination.

The content of the colorant in the entire toner particles is preferably 1% by mass or more and 30% by mass or less and is more preferably 3% by mass or more and 15% by mass or less.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The release agent may be an ester wax in order to enable the release agent to be finely dispersed in the production of the toner particles and consequently enhance the dispersibility of C.I. Pigment Red 57:1. Examples of the ester wax include an ester of a higher fatty acid having 10 or more carbon atoms with a monohydric or polyhydric alcohol, the ester having a melting temperature of 60° C. or more and 110° C. or less, preferably having a melting temperature of 65° C. or more and 100° C. or less, and more preferably having a melting temperature of 70° C. or more and 95° C. or less.

The ester wax is preferably an ester of a higher fatty acid having 10 to 25 carbon atoms with a monohydric or polyhydric alcohol (preferably, with a monohydric or polyhydric aliphatic alcohol having 8 or more carbon atoms) and is more preferably an ester of a higher fatty acid having 16 to 21 carbon atoms with a monohydric or polyhydric alcohol (preferably, with a monohydric or polyhydric aliphatic alcohol having 8 or more carbon atoms).

Examples of the ester wax include an ester of a higher fatty acid, such as capric acid, lauric acid, myristic acid, palmitic acid, stearic acid, arachidic acid, behenic acid, or oleic acid, with an alcohol (e.g., a monohydric alcohol, such as methanol, ethanol, propanol, isopropanol, butanol, capryl alcohol, lauryl alcohol, myristyl alcohol, cetyl alcohol, stearyl alcohol, or oleyl alcohol; or a polyhydric alcohol, such as glycerin, ethylene glycol, propylene glycol, sorbitol, or pentaerythritol). Specific examples thereof include a carnauba wax, a rice bran wax, a candelilla wax, a jojoba oil, a Japan wax, a beeswax, a Chinese wax, lanoline, and a montanic ester wax.

The melting temperature of the release agent is preferably 50° C. or more and 110° C. or less and is more preferably 60° C. or more and 100° C. or less.

The melting temperature of the release agent is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The content of the release agent in the entire toner particles is preferably 1% by mass or more and 20% by mass or less and is more preferably 5% by mass or more and 15% by mass or less.

Other Additives

Examples of the other additives include additives known in the related art, such as a magnetic substance, a charge-controlling agent, and an inorganic powder. These additives may be added to the toner particles as internal additives.

Properties of Toner Particles

The toner particles may have a single-layer structure or a "core-shell" structure constituted by a core (i.e., core particle) and a coating layer (i.e., shell layer) covering the core.

The core-shell structure of the toner particles may be constituted by, for example, a core including a binder resin and, as needed, other additives such as a colorant and a release agent and by a coating layer including the binder resin.

The volume average diameter D50v of the toner particles is preferably 2 μm or more and 10 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5 mass %-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.

The toner particles preferably has an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter](i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

The toner particles may be either the first toner particles or the second toner particles described below.

First Toner Particles

A toner particle that includes at least two crystalline resin domains satisfying conditions (A), (B1), (C), and (D) below when a cross section of the toner particle is observed.

Condition (A): the crystalline resin domain has an aspect ratio of 5 or more and 40 or less.

Condition (B1): the crystalline resin domain has a major axis length of 0.5 μm or more and 1.5 μm or less.

Condition (C): the angle formed by an extension of the major axis of the crystalline resin domain and a tangent to the surface of the toner particle at a point at which the extension intersects the surface of the toner particle is 600 or more and 90° or less.

Condition (D): the angle at which extensions of the major axes of two crystalline resin domains intersect each other is 45° or more and 90° or less.

Second Toner Particles

A toner particle that includes at least two crystalline resin domains satisfying conditions (A), (B2), (C), and (D) below when a cross section of the toner particle is observed.

Condition (A): the crystalline resin domain has an aspect ratio of 5 or more and 40 or less.

Condition (B2): the ratio of the major axis length of at least one of two crystalline resin domains to the maximum diameter of the toner particle is 10% or more and 30% or less.

Condition (C): the angle formed by an extension of the major axis of the crystalline resin domain and a tangent to the surface of the toner particle at a point at which the extension intersects the surface of the toner particle is 600 or more and 90° or less.

Condition (D): the angle at which extensions of the major axes of two crystalline resin domains intersect each other is 45° or more and 90° or less.

The first toner particles may be also the second toner particles and are not necessarily the second toner particles. It is preferable that the first toner particles be also the second toner particles.

The second toner particles may be also the first toner particles and are not necessarily the first toner particles. It is preferable that the second toner particles be also the first toner particles.

Figure 3:
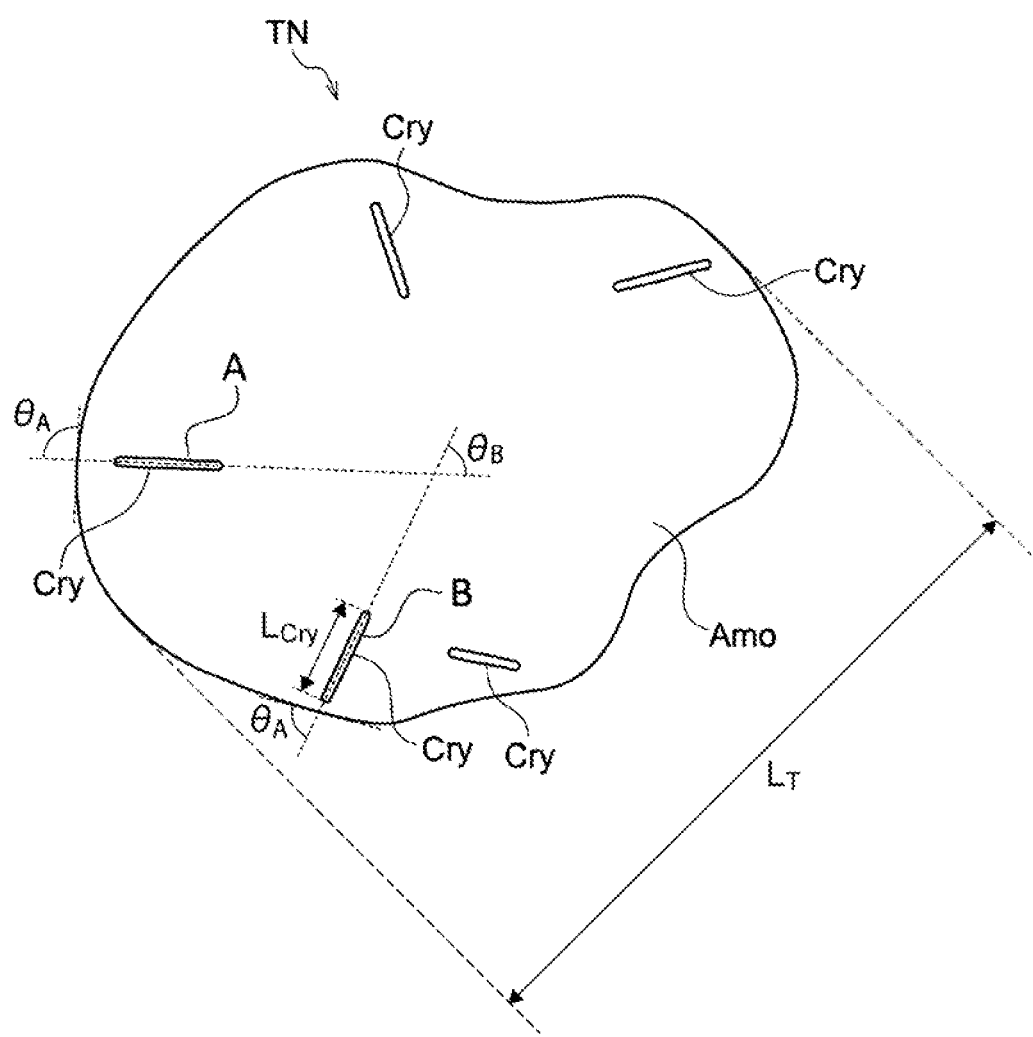
FIG. 3 is a schematic cross-sectional view of a particle of an electrostatic image developing toner according to an exemplary embodiment.

FIG. 3 is a schematic cross-sectional view of a toner particle. The meanings of the symbols used in FIG. 3 are as follows: TN: toner particle, Amo: amorphous resin, Cry: crystalline resin, $L_{Cry}$: major axis length of crystalline resin domain, $L_T$: maximum diameter of toner particle, $\theta_A$: angle formed by extension of major axis of crystalline resin domain and tangent to surface of toner particle at point at which the extension intersects the surface of the toner particle, $\theta_B$: angle at which extensions of major axes of two crystalline resin domains intersect each other.

A toner that includes the first or second toner particles may be excellent in terms of the quality of transfer to recording media having a relatively high water content. The reasons are presumably as follows.

In the first and second toner particles, at least two elliptical or acicular crystalline resin domains having a high aspect ratio and a large major axis length are arranged to extend from the surface-side portion of each toner particle toward the inside of the toner particle and intersect one another (see FIG. 3).

Since C.I. Pigment Red 57:1 has a high affinity for the crystalline resin, it is considered that C.I. Pigment Red 57:1 is incorporated in the crystalline resin domains or in the vicinity of the crystalline resin domains in the production of the toner particles. Thus, it is considered that C.I. Pigment Red 57:1 is dispersed along the arrangement of the crystalline resin domains inside the toner particles and, as a result, the likelihood of C.I. Pigment Red 57:1 being exposed at the surfaces of the toner particles is reduced. Toner particles in which the likelihood of C.I. Pigment Red 57:1 being exposed at the surfaces is low are considered excellent in terms of the quality of transfer to recording media having a relatively high water content.

When a cross section of the first toner particle is observed, at least two crystalline resin domains (preferably, at least three crystalline resin domains) satisfy the conditions (A), (B1), (C), and (D).

The proportion of the first toner particles to the entire toner particles is preferably 40% or more by number, is more preferably 70% or more by number, is further preferably 80% or more by number, and is particularly preferably 90% or more by number in order to enhance the quality of transfer to recording media having a relatively high water content. The proportion of the first toner particles to the entire toner particles is ideally 100% by number.

When a cross section of the second toner particle is observed, at least two crystalline resin domains (preferably, at least three crystalline resin domains) satisfy the conditions (A), (B2), (C), and (D).

The proportion of the second toner particles to the entire toner particles is preferably 40% or more by number, is more preferably 70% or more by number, is further preferably 80% or more by number, and is particularly preferably 90% or more by number in order to enhance the quality of transfer to recording media having a relatively high water content. The proportion of the second toner particles to the entire toner particles is ideally 100% by number.

Each of the conditions (A), (B1), (B2), (C), and (D) has a preferable range.

Condition (A)

The aspect ratio of the crystalline resin domain is 5 or more and 40 or less and is preferably 10 or more and 40 or less in order to enhance the quality of transfer to recording media having a relatively high water content.

The aspect ratio of the crystalline resin domain is the ratio of the major axis length to the minor axis length of the crystalline resin domain (major axis length/minor axis length). The major axis length of the crystalline resin domain is the maximum length of the crystalline resin domain. The minor axis length of the crystalline resin domain is the maximum of the lengths of the crystalline resin domain measured in a direction orthogonal to the extension of the major axis of the crystalline resin domain.

Condition (B1)

The major axis length of the crystalline resin domain ($L_{Cry}$ in FIG. 3) is 0.5 μm or more and 1.5 μm or less and is preferably 0.8 μm or more and 1.5 μm or less in order to enhance the quality of transfer to recording media having a relatively high water content.

Condition (B2)

The ratio of the major axis length of the crystalline resin domain ($L_{Cry}$ in FIG. 3) to the maximum diameter of the toner particle ($L_T$ in FIG. 3) is 10% or more and 30% or less, is preferably 13% or more and 30% or less, and is more preferably 17% or more and 30% or less in order to enhance the quality of transfer to recording media having a relatively high water content.

The maximum diameter of a toner particle is the maximum length of a line segment that connects any two points on the circumference of the cross section of the toner particle (i.e., major axis length).

Condition (C)

The angle ($\theta_A$ in FIG. 3) formed by the extension of the major axis of the crystalline resin domain and a tangent to the surface of the toner particle (i.e., the outer periphery of the toner particle) at the point at which the extension intersects the surface of the toner particle is 60° or more and 90° or less and is preferably 75° or more and 90° or less in order to enhance the quality of transfer to recording media having a relatively high water content.

Condition (D)

The angle ($\theta_B$ in FIG. 3) at which extensions of the major axes of two crystalline resin domains intersect each other is 450 or more and 90° or less and is preferably 600 or more and 90° or less in order to enhance the quality of transfer to recording media having a relatively high water content.

Method for Observing Cross Section of Toner Particle

A toner particle (or a toner particle including an external additive adhered thereon) is mixed with an epoxy resin so as to be buried in the epoxy resin. The epoxy resin is then solidified. The resulting solid is cut with an ultramicrotome apparatus "Ultracut UCT" produced by Leica Biosystems into a thin specimen having a thickness of 80 nm or more and 130 nm or less. The thin specimen is stained with ruthenium tetroxide in a desiccator at 30° C. for 3 hours. A transmission image-mode STEM observation image (acceleration voltage: 30 kV, magnification: 20,000 times) of the stained thin specimen is captured with an ultra-high-resolution field-emission scanning electron microscope (FE-SEM) "S-4800" produced by Hitachi High-Tech Corporation. While the image contains cross sections of toner particles having various sizes, cross sections of specific toner particles having a diameter that is 85% or more of the volume average particle size of the toner particles are selected and used for the observation. The diameter of a cross section of a toner particle is the maximum length of a line segment that connects any two points on the circumference of the cross section of the toner particle (i.e., major axis length).

In the image, an amorphous resin, a crystalline resin, and a release agent are distinguished from one another on the basis of contrast and shape. By ruthenium staining, an amorphous resin (e.g., an amorphous polyester resin) is stained most intensely, a crystalline resin (e.g., a crystalline polyester resin) is stained second most intensely, and a release agent is stained most slightly. When the contrast of the image is adjusted appropriately, an amorphous resin appears as black, a crystalline resin appears as light gray, and a release agent appears as white.

An image analysis of the crystalline resin domains is conducted to determine whether the toner particles satisfy the conditions (A), (B1), (B2), (C), and (D). For determining the proportion of the first or second toner particles, 100 toner particles are observed and the proportion of the number of the first or second toner particles is calculated.

The first and second toner particles may satisfy the condition (E) below in order to enhance the quality of transfer to recording media having a relatively high water content.

Condition (E): when a cross section of a toner particle is observed, a domain composed of the release agent is present at a position 50 nm or more below the surface of the toner particle. That is, when a cross section of a toner particle is observed, the shortest distance between a release agent domain present in the toner particle and the surface (i.e., the outer periphery) of the toner particle is 50 nm or more.

The condition (E) means that the release agent domains are not exposed at the surfaces of the toner particles. If the release agent domains are exposed at the surfaces of the toner particles, the external additive may be unevenly distributed at the portions at which the release agent is exposed. In contrast, when the release agent domains are present at a position 50 nm or more below the surface of each toner particle, the external additive may adhere onto the surfaces of the toner particles in a substantially uniform manner and, consequently, quality of transfer to recording media having a relatively high water content may be enhanced.

Whether the condition (E) is satisfied is determined by the above-described method for observing a cross section of a toner particle.

The proportion of the first toner particles that satisfy the condition (E) to the entire toner particles is preferably 40% or more by number, is more preferably 70% or more by number, is further preferably 80% or more by number, and is particularly preferably 90% or more by number in order to enhance the quality of transfer to recording media having a relatively high water content. The above proportion is ideally 100% by number.

The proportion of the second toner particles that satisfy the condition (E) to the entire toner particles is preferably 40% or more by number, is more preferably 70% or more by number, is further preferably 80% or more by number, and is particularly preferably 90% or more by number in order to enhance the quality of transfer to recording media having a relatively high water content. The above proportion is ideally 100% by number.

External Additive Examples of the external additive include inorganic particles. Examples of the inorganic particles include $SiO_2$ particles, $TiO_2$ particles, $Al_2O_3$ particles, $CuO$ particles, $ZnO$ particles, $SnO_2$ particles, $CeO_2$ particles, $Fe_2O_3$ particles, $MgO$ particles, $BaO$ particles, $CaO$ particles, $K_2O$ particles, $Na_2O$ particles, $ZrO_2$ particles, $CaO \cdot SiO_2$ particles, $K_2O \cdot (TiO_2)_n$ particles, $Al_2O_3 \cdot 2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more. The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate, or a melamine resin; and particles of a cleaning lubricant, such as a metal salt of a higher fatty acid, such as zinc stearate, or a fluorine-contained resin.

The amount of the external additive used is preferably 0.01% by mass or more and 5% by mass or less and is more preferably 0.01% by mass or more and 2.0% by mass or less of the amount of the toner particles.

Method for Producing Toner

The toner according to the exemplary embodiment is produced by, after the preparation of the toner particles, depositing an external additive on the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used. Among these methods, aggregation coalescence may be used in order to prepare the toner particles.

Specifically, in the case where aggregation coalescence is used in order to prepare the toner particles, the toner particles are prepared by the following steps:

preparing an amorphous resin particle dispersion liquid in which amorphous resin particles are dispersed and a crystalline resin particle dispersion liquid in which crystalline resin particles are dispersed (i.e., resin particle dispersion liquid preparation step);

causing the amorphous resin particles (and, as needed, other particles) to aggregate together in the amorphous resin particle dispersion liquid (or in the amorphous resin particle dispersion liquid mixed with another particle dispersion liquid as needed) in order to form first aggregated particles (i.e., first aggregated particle formation step);

repeatedly conducting the operation of mixing an aggregated particle dispersion liquid containing the first aggregated particles dispersed therein with the amorphous resin particle dispersion liquid and the crystalline resin particle dispersion liquid (or, mixing an aggregated particle dispersion liquid containing the first aggregated particles dispersed therein with a liquid mixture of the amorphous resin particle dispersion liquid and the crystalline resin particle dispersion liquid) to cause aggregation such that the amorphous resin particles and the crystalline resin particles are further adhered onto the surfaces of the first aggregated particles two or more times in order to form second aggregated particles (i.e., second aggregated particle formation step);

mixing the resulting aggregated particle dispersion liquid containing the second aggregated particles dispersed therein with the amorphous resin particle dispersion liquid to cause aggregation such that the amorphous resin particles are adhered onto the surfaces of the second aggregated particles in order to form third aggregated particles (i.e., third aggregated particle formation step); and heating the resulting aggregated particle dispersion liquid in which the third aggregated particles are dispersed in order to cause fusion and coalescence of the aggregated particles and thereby form toner particles (fusion-coalescence step).

Each of the above steps is described below in detail. Hereinafter, a method for preparing toner particles including a colorant and a release agent is described. However, it should be noted that the colorant and the release agent are optional. It is needless to say that additives other than a colorant and a release agent may be used.

Resin Particle Dispersion Liquid Preparation Step

An amorphous resin particle dispersion liquid containing the amorphous resin particles dispersed therein and a crystalline resin particle dispersion liquid containing the crystalline resin particles dispersed therein are prepared.

The amorphous resin particle dispersion liquid may further contain a colorant. An amorphous resin particle dispersion liquid containing amorphous resin particles and colorant particles dispersed therein may be prepared by dispersing the colorant when the amorphous resin is dispersed in a dispersion medium.

The resin particle dispersion liquid is prepared by, for example, dispersing resin particles in a dispersion medium using a surfactant.

Examples of the dispersion medium used for preparing the resin particle dispersion liquid include aqueous media. Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

In the preparation of the resin particle dispersion liquid, the resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the resin particles used, the resin particles may be dispersed in the dispersion medium by, for example, phase-inversion emulsification. Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform phase inversion from W/O to O/W and disperse the resin in the aqueous medium in the form of particles.

The volume average diameter of the resin particles dispersed in the resin particle dispersion liquid is preferably, for example, 0.01 μm or more and 1 μm or less, is more preferably 0.08 μm or more and 0.8 μm or less, and is further preferably 0.1 μm or more and 0.6 μm or less.

The volume average diameter of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average diameters of particles included in the other dispersion liquids are also determined in the above-described manner.

The content of the resin particles included in the resin particle dispersion liquid is preferably 5% by mass or more and 50% by mass or less and is more preferably 10% by mass or more and 40% by mass or less.

The colorant particle dispersion liquid, the release agent particle dispersion liquid, and the like are also prepared as in the preparation of the resin particle dispersion liquid. In other words, the above-described specifications for the volume average diameter of the particles included in the resin particle dispersion liquid, the dispersion medium of the resin particle dispersion liquid, the dispersion method used for preparing the resin particle dispersion liquid, and the content of the particles in the resin particle dispersion liquid can also be applied to colorant particles dispersed in the colorant particle dispersion liquid and release agent particles dispersed in the release agent particle dispersion liquid.

First Aggregated Particle Formation Step

The amorphous resin particle dispersion liquid is mixed with the colorant particle dispersion liquid and the release agent particle dispersion liquid. In the resulting mixed dispersion liquid, heteroaggregation of the amorphous resin particles with the colorant particles and the release agent particles is performed in order to form first aggregated particles including the amorphous resin particles, the colorant particles, and the release agent particles, the first aggregated particles having a diameter close to that of the desired toner particles. The amorphous resin particle dispersion liquid may be an amorphous resin particle dispersion liquid containing amorphous resin particles and colorant particles dispersed therein.

Specifically, for example, a flocculant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to a temperature close to the glass transition temperature of the resin particles (specifically, e.g., [glass transition temperature of the resin particles −30° C.] or more and [the glass transition temperature −10° C.] or less), and thereby the particles dispersed in the mixed dispersion liquid are caused to aggregate together to form first aggregated particles.

In the first aggregated particle formation step, alternatively, for example, the above flocculant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the flocculant include surfactants, inorganic metal salts, and divalent or higher metal complexes that have a polarity opposite to that of the surfactant included in the mixed dispersion liquid. Using a metal complex as a flocculant reduces the amount of surfactant used and, as a result, charging characteristics may be enhanced.

An additive capable of forming a complex or a bond similar to a complex with the metal ions contained in the flocculant may optionally be used in combination with the flocculant. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent used is preferably 0.01 parts by mass or more and 5.0 parts by mass or less and is more preferably 0.1 parts by mass or more and less than 3.0 parts by mass relative to 100 parts by mass of the resin particles.

Second Aggregated Particle Formation Step

The resulting aggregated particle dispersion liquid containing the first aggregated particles dispersed therein is mixed with the amorphous resin particle dispersion liquid and the crystalline resin particle dispersion liquid. Alternatively, the aggregated particle dispersion liquid containing the first aggregated particles dispersed therein may be mixed with a liquid mixture of the amorphous resin particle dispersion liquid and the crystalline resin particle dispersion liquid. Subsequently, in a dispersion liquid containing the first aggregated particles, the amorphous resin particles, and the crystalline resin particles dispersed therein, aggregation is performed such that the amorphous resin particles and the crystalline resin particles are adhered onto the surfaces of the first aggregated particles.

Specifically, for example, when the size of the first aggregated particles reaches the intended particle size in the first aggregated particle formation step, the amorphous resin particle dispersion liquid and the crystalline resin particle dispersion liquid are added to the above dispersion liquid and heating is subsequently performed at a temperature equal to or less than the glass transition temperature of the amorphous resin particles. The above aggregation operation is repeated two or more times to form the second aggregated particles.

Magnesium chloride or the like may be added to the dispersion liquid in the second aggregated particle formation step in order to add Mg and Cl ions to the toner particles.

Third Aggregated Particle Formation Step

The resulting aggregated particle dispersion liquid containing the second aggregated particles dispersed therein is mixed with the amorphous resin particle dispersion liquid to perform aggregation in a dispersion liquid containing the second aggregated particles and the amorphous resin particles dispersed therein such that the amorphous resin particles are adhered onto the surfaces of the second aggregated particles.

Specifically, for example, when the size of the second aggregated particles reaches the intended particle size in the second aggregated particle formation step, the amorphous resin particle dispersion liquid is added to the above dispersion liquid and heating is subsequently performed at a temperature equal to or less than the glass transition temperature of the amorphous resin particles. Then, the progress of the aggregation is stopped by adjusting the pH of the dispersion liquid.

Magnesium chloride or the like may be added to the dispersion liquid in the third aggregated particle formation step in order to add Mg and Cl ions to the toner particles.

Fusion-Coalescence Step

The aggregated particle dispersion liquid in which the third aggregated particles are dispersed is heated to, for example, a temperature equal to or higher than the glass transition temperature of the amorphous resin particles (e.g., to a temperature higher than the glass transition temperature of the amorphous resin particles by 10° C. to 30° C.) in order to perform fusion and coalescence of the aggregated particles. Hereby, toner particles are prepared.

Subsequent to the heating performed for fusion and coalescence, for example, cooling may be performed to 30° C. at a cooling rate of 5° C./min or more and 40° C./min or less. Performing rapid cooling in the above-described manner increases the likelihood of the contraction of the surfaces of the toner particles. This may increase the formation of cracks that extend from the inside of each toner particle toward the surface.

Subsequently, reheating is performed at 0.1° C./min or more and 2° C./min or less, and holding is performed at a temperature equal to or higher than the melting temperature of the crystalline resin minus 5° C. for 10 minutes or more. Then, slow cooling is performed at 0.1° C./min or more and 1° C./min or less in order to cause crystalline resin domains to glow in the directions of the cracks, that is, to cause crystalline resin domains to glow in the direction from the inside of each toner particle toward the surface, such that the crystalline resin domains satisfy the above-described conditions.

For example, when the temperature is increased to be equal to or higher than the melting temperature of the release agent during reheating, the possibility of the release agent domains glowing to reach the vicinity of the surface of each toner particle may be increased. Therefore, the temperature at which heating is performed subsequent to reheating may be equal to or higher than the melting temperature of the crystalline resin minus 5° C. and equal to or less than the melting temperature of the release agent.

After the completion of the fusion-coalescence step, the toner particles formed in the solution are subjected to any suitable cleaning step, solid-liquid separation step, and drying step that are known in the related art in order to obtain dried toner particles. In the cleaning step, the toner particles may be subjected to displacement washing using ion-exchange water to a sufficient degree from the viewpoint of electrification characteristics. Examples of a solid-liquid separation method used in the solid-liquid separation step include suction filtration and pressure filtration from the viewpoint of productivity. Examples of a drying method used in the drying step include freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Electrostatic Image Developer

An electrostatic image developer according to the exemplary embodiment includes at least the toner according to the exemplary embodiment. The electrostatic image developer according to the exemplary embodiment may be a single component developer including only the toner according to the exemplary embodiment or may be a two-component developer that is a mixture of the toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin. The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin. The coat resin and the matrix resin may optionally include additives, such as conductive particles. Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a resin by, for example, using a coating-layer forming solution prepared by dissolving the coat resin and, as needed, various types of additives in a suitable solvent. The type of the solvent is not limited and may be selected with consideration of the type of the resin used, ease of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner:carrier=1:100 to 30:100 and is more preferably 3:100 to 20:100.

Image Forming Apparatus and Image Forming Method

An image forming apparatus and an image forming method according to the exemplary embodiment are described below.

The image forming apparatus according to the exemplary embodiment includes an image holding member; a charging unit that charges the surface of the image holding member; an electrostatic image formation unit that forms an electrostatic image on the charged surface of the image holding member; a developing unit that includes an electrostatic image developer and develops the electrostatic image formed on the surface of the image holding member with the electrostatic image developer to form a toner image; a transfer unit that transfers the toner image formed on the surface of the image holding member onto the surface of a recording medium; and a fixing unit that fixes the toner image onto the surface of the recording medium. The electrostatic image developer is the electrostatic image developer according to the exemplary embodiment.

The image forming apparatus according to the exemplary embodiment uses an image forming method (image forming method according to the exemplary embodiment) including charging the surface of the image holding member; forming an electrostatic image on the charged surface of the image holding member; developing the electrostatic image formed on the surface of the image holding member with the electrostatic image developer according to the exemplary embodiment to form a toner image; transferring the toner image formed on the surface of the image holding member onto the surface of a recording medium; and fixing the toner image onto the surface of the recording medium.

The image forming apparatus according to the exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning unit that cleans the surface of the image holding member subsequent to the transfer of the toner image before the image holding member is again charged; and an image forming apparatus including a static-erasing unit that erases static by irradiating the surface of an image holding member with static-erasing light subsequent to the transfer of the toner image before the image holding member is again charged.

In the case where the image forming apparatus according to the exemplary embodiment is the intermediate-transfer image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to the exemplary embodiment, for example, a portion including the developing unit may have a cartridge structure (i.e., process cartridge) detachably attachable to the image forming apparatus. An example of the process cartridge is a process cartridge including the electrostatic image developer according to the exemplary embodiment and the developing unit.

An example of the image forming apparatus according to the exemplary embodiment is described below, but the image forming apparatus is not limited thereto. Hereinafter, only components illustrated in drawings are described; others are omitted.

FIG. 1 schematically illustrates the image forming apparatus according to the exemplary embodiment.

The image forming apparatus illustrated in FIG. 1 includes first to fourth electrophotographic image formation units 10Y, 10M, 10C, and 10K that form yellow (Y), magenta (M), cyan (C), and black (K) images, respectively, on the basis of color separation image data. The image formation units (hereinafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt (example of the intermediate transfer body) 20 runs above and extends over the units 10Y, 10M, 10C, and 10K. The intermediate transfer belt 20 is wound around a drive roller 22 and a support roller 24 and runs clockwise in FIG. 1, that is, in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer body-cleaning device 30 is disposed so as to contact with the image-carrier-side surface of the intermediate transfer belt 20 and to face the drive roller 22.

Developing devices (examples of the developing units) 4Y, 4M, 4C, and 4K of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs.

The first unit 10Y includes a photosensitive member 1Y serving as an image holding member. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer subunit) 5Y that transfers the developed toner image to the intermediate transfer belt 20; and a photosensitive-member cleaning device (example of the cleaning unit) 6Y that removes a toner remaining on the surface of the photosensitive member 1Y after the first transfer.

The first transfer roller 5Y is disposed so as to contact with the inner surface of the intermediate transfer belt 20 and to face the photosensitive member 1Y. Each of the first transfer rollers 5Y, 5M, 5C, and 5K of the respective units is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive substrate (e.g., volume resistivity at 20° C.: $1 \times 10^{-6}$ Ωcm or less). The photosensitive layer is normally of high resistance (comparable with the resistance of ordinary resins), but, upon being irradiated with the laser beam, the specific resistance of the portion irradiated with the laser beam varies. Thus, the exposure device 3 irradiates the surface of the charged photosensitive member 1Y with the laser beam 3Y on the basis of the image data of the yellow image sent from the controller (not illustrated). As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is developed and visualized in the form of a toner image by the developing device 4Y at the developing position.

The developing device 4Y includes an electrostatic image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the erased latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, in the first unit 10Y, for example, +10 µA by a controller (not illustrated).

The toner particles remaining on the photosensitive member 1Y are removed by the photosensitive-member cleaning device 6Y and then collected.

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The resulting intermediate transfer belt 20 on which toner images of four colors are multiple-transferred in the first to fourth units is then transported to a second transfer section including a support roller 24 contacting with the inner surface of the intermediate transfer belt 20 and a second transfer roller (example of the second transfer subunit) 26 disposed on the image-carrier-side of the intermediate transfer belt 20. A recording paper (example of the recording medium) P is fed by a feed mechanism into a narrow space between the second transfer roller 26 and the intermediate transfer belt 20 that contact with each other at the predetermined timing. The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

Subsequently, the recording paper P is transported into a nip part of the fixing device (example of the fixing unit) 28 at which a pair of fixing rollers contact with each other. The toner image is fixed to the recording paper P to form a fixed image.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

The recording paper P, to which the color image has been fixed, is transported toward an exit portion. Thus, the series of the steps for forming a color image are terminated.

Process Cartridge

A process cartridge according to the exemplary embodiment is described below.

The process cartridge according to the exemplary embodiment includes a developing unit that includes the electrostatic image developer according to the exemplary embodiment and develops an electrostatic image formed on the surface of an image holding member with the electrostatic image developer to form a toner image. The process cartridge according to the exemplary embodiment is detachably attachable to an image forming apparatus.

The structure of the process cartridge according to the exemplary embodiment is not limited to the above-described one. The process cartridge according to the exemplary embodiment may further include, in addition to the developing unit, at least one unit selected from an image holding member, a charging unit, an electrostatic image formation unit, a transfer unit, etc.

An example of the process cartridge according to the exemplary embodiment is described below, but the process cartridge is not limited thereto. Hereinafter, only components illustrated in FIG. 2 are described; others are omitted.

Figure 2:
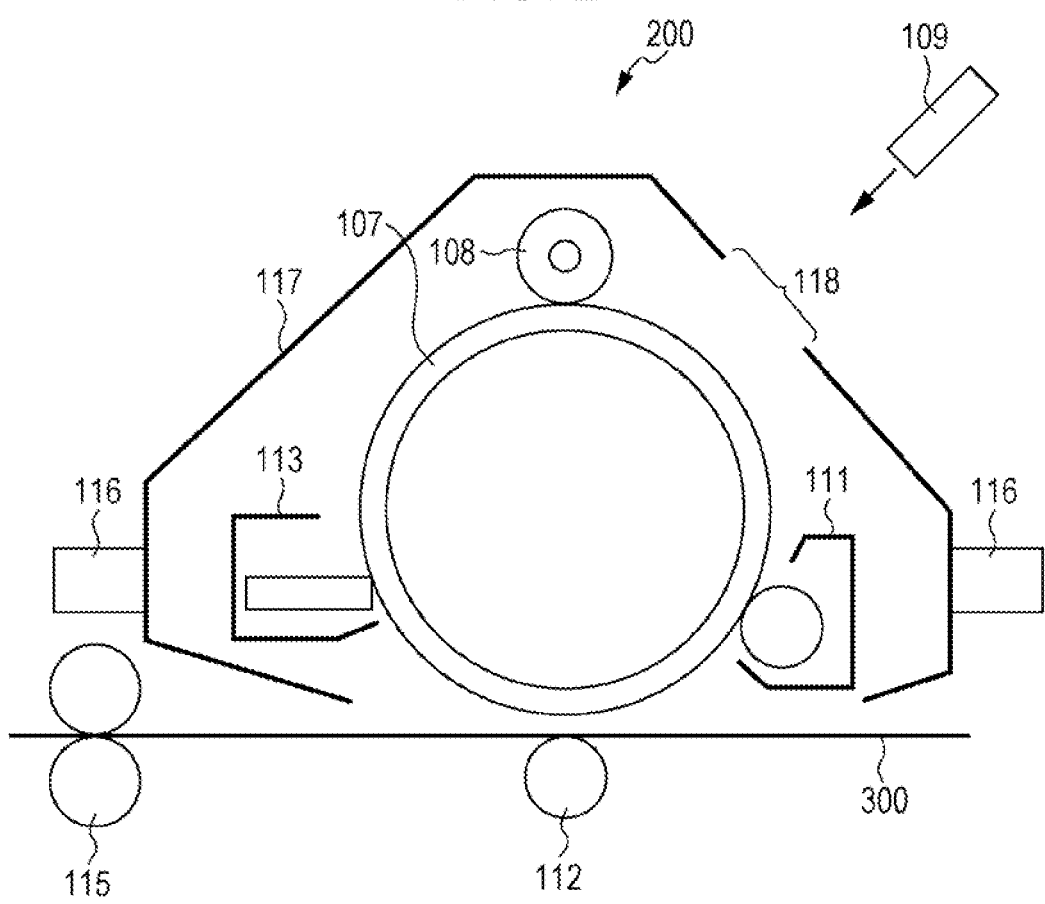
FIG. 2 is a schematic diagram illustrating an example of a process cartridge according to an exemplary embodiment which is detachably attachable to an image forming apparatus.

FIG. 2 schematically illustrates the process cartridge according to the exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic image formation unit), Reference numeral 112 denotes a transfer device (example of the transfer unit), Reference numeral 115 denotes a fixing device (example of the fixing unit), and the Reference numeral 300 denotes recording paper (example of the recording medium).

EXAMPLES

Details of the exemplary embodiment of the present disclosure are described below with reference to Examples below. The exemplary embodiment of the present disclosure is not limited to Examples below. Hereinafter, the terms "part" and "%" are on a mass basis unless otherwise specified.

Synthesis of Amorphous Polyester Resin (A)
Terephthalic acid: 152 parts
Fumaric acid: 75 parts
Dodecenylsuccinic acid: 114 parts
Bisphenol A-propylene oxide adduct: 469 parts
Bisphenol A-ethylene oxide adduct: 137 parts The above materials are charged into a container equipped with a stirrer, a thermometer, a condenser, and a nitrogen gas introduction pipe. Into the container, 4 parts of dibutyltin oxide used as a catalyst is charged. Subsequently, a nitrogen gas is introduced into the container to create an inert atmosphere. While the inert atmosphere is maintained, the temperature is increased. Then, a reaction is conducted for 12 hours while the temperature inside the container is kept at 150° C. or more and 230° C. or less. Subsequently, the pressure is gradually reduced while the temperature inside the container is kept at 210° C. or more and 250° C. or less. Hereby, an amorphous polyester resin (A) having a weight average molecular weight of 10,500 and a glass transition temperature of 60° C. is prepared.

Preparation of Amorphous Polyester Resin Particle Dispersion Liquid (A1) Containing C.I. Pigment Red 57:1

Into a Henschel mixer, 250 parts of the amorphous polyester resin (A) and 50 parts of C.I. Pigment Red 57:1 produced by DIC corporation are charged. The resulting mixture is stirred with a screw rotating at 600 rpm for 120 seconds to form a raw material (A). Into a raw material input port of a twin screw extruder "TEM-58SS" produced by Toshiba Machine Co., Ltd., 200 parts of the raw material (A) and 0.2 parts of a 50% aqueous sodium hydroxide solution are charged. From the fourth barrel of the twin screw extruder, 4.1 parts of a 48.5% aqueous solution of sodium dodecyldiphenyl ether sulfonate "ELEMINOL MON-7" produced by Sanyo Chemical Industries, Ltd. is charged. The resulting mixture is kneaded with barrels kept at 95° C. and a screw rotating at 240 rpm. Subsequently, 150 parts, 150 parts, and 15 parts of ion-exchange water having a temperature of 95° C. are charged from the fifth, seventh, and ninth barrels of the twin screw extruder, respectively.

Kneading is performed such that the average feed rate of the raw material (A) is 200 kg/h. Hereby, a resin particle dispersion liquid containing resin particles having a volume average size of 180 nm is prepared. The solid content in the resin particle dispersion liquid is adjusted to be 25% by the addition of ion-exchange water. Hereby, an amorphous polyester resin particle dispersion liquid (A1) containing C.I. Pigment Red 57:1 is prepared.

Synthesis of Crystalline Polyester Resin (B)

1,10-Decanedicarboxylic acid: 241 parts 1,9-Nonanediol: 174 parts

The above materials are charged into a container equipped with a stirrer, a thermometer, a condenser, and a nitrogen gas introduction pipe. After the gas inside the container has been purged with a dry nitrogen gas, 0.25 parts of titanium tetrabutoxide is charged into the container relative to 100 parts of the above materials. The resulting mixture is stirred at 170° C. for 6 hours in a stream of nitrogen gas to cause a reaction. Then, the temperature is increased to 210° C., the pressure inside the container is reduced to 3 kPa, and stirring is performed for 13 hours under reduced pressure for 13 hours to cause a reaction. Hereby, a crystalline polyester resin (B) having a weight average molecular weight of 17,200 and a melting temperature of 75° C. is prepared.

Preparation of Crystalline Polyester Resin Particle Dispersion Liquid (B1)

Into a separable flask, 70 parts of ethyl acetate and 15 parts of isopropyl alcohol are charged and mixed. To the flask, 100 parts of the crystalline polyester resin (B) is gradually added. The resulting mixture is stirred with a three-one motor in order to dissolve the resin and form an oil phase. To the oil phase, 3 parts of a 10% ammonia water solution is added dropwise with a dropper. Furthermore, 230 parts of ion-exchange water is added dropwise to the oil phase at a drop rate of 10 ml/min to perform phase-inversion emulsification. Subsequently, the solvent is removed while the pressure is reduced with an evaporator. Hereby, a resin particle dispersion liquid containing resin particles having a volume average particle size of 165 nm is prepared. The solid content in the resin particle dispersion liquid is adjusted to be 25% by the addition of ion-exchange water. Hereby, a crystalline polyester resin particle dispersion liquid (B1) is prepared.

Preparation of Styrene Acrylic Resin Particle Dispersion Liquid (C1)

Styrene: 300 parts n-Butyl acrylate: 90 parts

Acrylic acid: 0.1 parts

Dodecanethiol: 1 part 2-(Dimethylamino ester) methacrylate: 1 part

A mixture prepared by mixing the above materials with one another to form a solution is dispersed in a surfactant solution prepared by dissolving 6 parts of a non-ionic surfactant "NONIPOL 400" produced by Sanyo Chemical Industries, Ltd. and an anionic surfactant "NEOGEN SC" produced by Dai-ichi Kogyo Seiyaku Co., Ltd. in 550 parts of ion-exchange water and emulsification is performed in a flask. Subsequently, while the contents of the flask are stirred, an aqueous solution prepared by dissolving 4 parts of ammonium persulfate in 50 parts of ion-exchange water is charged into the flask over 10 minutes. After nitrogen purging has been performed, the temperature is increased with an oil bath until the temperature of the contents reaches 70° C. while the contents of the flask are stirred. The temperature is kept at 70° C. for 5 hours in order to continue the emulsion polymerization. Hereby, a resin particle dispersion liquid containing resin particles having a weight average molecular weight of 30,000, a glass transition temperature of 52° C., and a volume average particle size of 120 nm is prepared. The solid content in the resin particle dispersion liquid is adjusted to be 25% by the addition of ion-exchange water. Hereby, a styrene acrylic resin particle dispersion liquid (C1) is prepared.

Preparation of Release Agent Particle Dispersion Liquid (W1)

Ester wax "WEP-8" produced by NOF CORPORATION (melting temperature: 79° C.): 100 parts Anionic surfactant "NEOGEN RK" produced by Dai-ichi Kogyo Seiyaku Co., Ltd.: 1 part Ion-exchange water: 350 parts The above materials are mixed with one another and heated to 100° C. The resulting mixture is dispersed with a homogenizer "ULTRA-TURRAX T50" produced by IKA and then further dispersed with a pressure-discharge Gaulin homogenizer. Hereby, a release agent particle dispersion liquid in which release agent particles having a volume average particle size of 200 nm are dispersed is prepared. Ion-exchange water is added to the release agent particle dispersion liquid in order to adjust the solid content in the dispersion liquid to be 20%. Hereby, a release agent particle dispersion liquid (W1) is prepared.

Example 1

Preparation of Toner Particles

Ion-exchange water: 200 parts

Amorphous polyester resin particle dispersion liquid (A1): 80 parts

Styrene acrylic resin particle dispersion liquid (C1): 50 parts

Release agent particle dispersion liquid (W1): 15 parts

Anionic surfactant (TaycaPower): 2.8 parts

The above materials are charged into a round-bottom flask made of stainless steel. After the pH has been adjusted to be 3.5 by addition of 0.1 N (0.1 mol/L) nitric acid, an aqueous magnesium chloride solution prepared by dissolving 6 parts of magnesium chloride in 30 parts of ion-exchange water is added to the flask. After dispersion has been performed with a homogenizer "ULTRA-TURRAX T50" produced by IKA at 30° C., the temperature is increased to 45° C. in a heating oil bath. Then, holding is performed until the volume average particle size reaches 4.5 μm.

Subsequently, 30 parts of the amorphous polyester resin particle dispersion liquid (A1) and 15 parts of the crystalline polyester resin particle dispersion liquid (B1) are added. Furthermore, 4 parts of the aqueous magnesium chloride solution is added. Then, holding is performed for 30 minutes. The addition of the three components is conduced 4 times in total at intervals of 30 minutes.

Subsequently, 40 parts of the amorphous polyester resin particle dispersion liquid (A1) and 4 parts of the aqueous magnesium chloride solution are added. Furthermore, 10 parts of a 10% aqueous solution of nitrilotriacetic acid metal salt "CHELEST 70" produced by CHELEST CORPORATION is added. The pH is adjusted to be 9.0 using a 1N aqueous sodium hydroxide solution.

Subsequently, 1 part of an anionic surfactant "TaycaPower" is charged. While stirring is continued, the temperature is increased to 85° C. at a heating rate of 0.05° C./min. After holding has been performed at 85° C. for 3 hours, the temperature is reduced to 30° C. at 15° C./min (i.e., first cooling). Then, the temperature is increased to 85° C. at a heating rate of 0.2° C./min (i.e., reheating). Subsequently, after holding has been performed for 30 minutes, the temperature is cooled to 30° C. at 0.5° C./min (i.e., second cooling).

Subsequently, the solid content is separated by filtration, cleaned with ion-exchange water, and then dried. Hereby, toner particles (1) having a volume average particle size of 6.0 µm are prepared.

Addition of External Additive

With 100 parts of the toner particles (1), 1.5 parts of hydrophobic silica "RY50" produced by Nippon Aerosil Co., Ltd. is mixed. The resulting mixture is stirred with a sample mill at a rotation speed of 10,000 rpm for 30 seconds. Then, sieving is performed with a vibration sieve having an opening of 45 µm. Hereby, a toner (1) is prepared. The toner (1) has a volume average particle size of 6.0 µm.

Measurement of Net Intensities $N_{Ca}$, $N_{Mg}$, and $N_{Cl}$

Using the toner (1) as an sample, a qualitative and quantitative elemental analysis is conducted with an X-ray analyzer "ZSX Primus II" produced by Rigaku Corporation in order to determine the Net intensities (unit: kcps) of Ca, Mg, and Cl elements.

Measurement of Domains in Toner Particles

The domains included in the toner particles are measured in accordance with the method described above. The toner prepared in Example 1 includes toner particles that satisfy all of the conditions (A), (B1), (B2), (C), (D), and (E). The proportion of such toner particles to the entire toner particles is 70% or more by number.

Preparation of Carrier

After 500 parts of spherical magnetite powder particles (volume average particle size: 0.55 µm) have been stirred with a Henschel mixer, 5 parts of a titanate coupling agent is added to the magnetite powder particles. The resulting mixture is heated to 100° C. and then stirred for 30 minutes. Subsequently, 6.25 parts of phenol, 9.25 parts of 35% formalin, 500 parts of the magnetite particles treated with a titanate coupling agent, 6.25 parts of 25% ammonia water, and 425 parts of water are charged into a four-necked flask. While stirring is performed, a reaction is conducted at 85° C. for 120 minutes. Subsequently, the temperature is reduced to 25° C. After 500 parts of water has been added to the flask, the supernatant is removed and the precipitate is cleaned with water. The cleaned precipitate is dried by being heated under reduced pressure. Hereby, a carrier (M) having an average particle size of 35 µm is prepared.

Mixing of Toner and Carrier

The toner (1) and the carrier (M) are charged into a V-blender at a mass ratio of Toner(1):Carrier(M)=5:95. The resulting mixture is stirred for 20 minutes to form a developer (1).

Examples 2 to 4

Toner particles (2) to (4) are prepared as in the preparation of the toner particles (1), except that the amount of the aqueous magnesium chloride solution used is increased.

Toners (2) to (4) and developers (2) to (4) are prepared as in the preparation of the toner (1) and the developer (1), except that a specific one of the toner particle samples (2) to (4) is used instead of the toner particles (1).

Comparative Example 1

Toner particles (C1) are prepared as in the preparation of the toner particles (1), except that an aqueous aluminum sulfate solution is prepared by dissolving 6 parts of aluminum sulfate in 30 parts of ion-exchange water and the aqueous aluminum sulfate solution is used instead of the aqueous magnesium chloride solution.

A toner (C1) and a developer (C1) are prepared as in the preparation of the toner (1) and the developer (1), except that the toner particles (C1) are used instead of the toner particles (1).

Comparative Example 2

Toner particles (C2) are prepared as in the preparation of the toner particles (1), except that the amount of the aqueous magnesium chloride solution used is increased.

A toner (C2) and a developer (C2) are prepared as in the preparation of the toner (1) and the developer (1), except that the toner particles (C2) are used instead of the toner particles (1).

Example 5

Preparation of Toner Particles

Ion-exchange water: 200 parts

Amorphous polyester resin particle dispersion liquid (A1): 80 parts

Crystalline polyester resin particle dispersion liquid (B1): 60 parts

Styrene acrylic resin particle dispersion liquid (C1): 50 parts

Release agent particle dispersion liquid (W1): 15 parts

Anionic surfactant (TaycaPower): 2.8 parts

The above materials are charged into a round-bottom flask made of stainless steel. After the pH has been adjusted to be 3.5 by addition of 0.1 N (0.1 mol/L) nitric acid, an aqueous magnesium chloride solution prepared by dissolving 6 parts of magnesium chloride in 30 parts of ion-exchange water is added to the flask. After dispersion has been performed with a homogenizer "ULTRA-TURRAX T50" produced by IKA at 30° C., the temperature is increased to 45° C. in a heating oil bath. Then, holding is performed until the volume average particle size reaches 5.0 µm.

Subsequently, 160 parts of the amorphous polyester resin particle dispersion liquid (A1) is added. Furthermore, 20 parts of the aqueous magnesium chloride solution is added. Then, holding is performed until the average particle size reaches the intended particle size. Subsequently, 10 parts of a 10% aqueous solution of nitrilotriacetic acid metal salt "CHELEST 70" produced by CHELEST CORPORATION is added. The pH is adjusted to be 9.0 using a 1N aqueous sodium hydroxide solution. Subsequently, 1 part of an anionic surfactant "TaycaPower" is charged. While stirring is continued, the temperature is increased to 85° C. at a heating rate of 0.05° C./min. After holding has been performed at 85° C. for 3 hours, the temperature is reduced to 30° C. at 0.5° C./min. Subsequently, the solid content is separated by filtration, cleaned with ion-exchange water, and then dried. Hereby, toner particles (5) having a volume average particle size of 6.0 µm are prepared.

Addition of External Additive

With 100 parts of the toner particles (5), 1.5 parts of hydrophobic silica "RY50" produced by Nippon Aerosil Co., Ltd. is mixed. The resulting mixture is stirred with a sample mill at a rotation speed of 10,000 rpm for 30 seconds.

Then, sieving is performed with a vibration sieve having an opening of 45 μm. Hereby, a toner (5) is prepared. The toner (5) has a volume average particle size of 6.0 μm.

Measurement of Net Intensities $N_{Ca}$, $N_{Mg}$, and $N_{Cl}$

Using the toner (5) as an sample, a qualitative and quantitative elemental analysis is conducted with an X-ray analyzer "ZSX Primus II" produced by Rigaku Corporation in order to determine the Net intensities (unit: kcps) of Ca, Mg, and Cl elements.

G3: Color missing is present in the recesses of the embossed paper sheet in an amount 5% or more and less than 10% of the area of the image.

G4: Color missing is present in the recesses of the embossed paper sheet in an amount 10% or more and less than 30% of the area of the image.

G5: Color missing is present in the recesses of the embossed paper sheet in an amount 30% or more of the area of the image.

TABLE 1

| | Toner and developer No. | Volume average size of toner particles μm | Net intensity of Ca $N_{Ca}$ kcps | Net intensity of Mg $N_{Mg}$ kcps | Net intensity of Cl $N_{Cl}$ kcps | $(N_{Mg} + N_{Cl})/N_{Ca}$ | Proportion of first toner particles Number % | Proportion of second toner particles Number % | Transfer quality — |
|---|---|---|---|---|---|---|---|---|---|
| Comparative example 1 | (C1) | 6.2 | 1.60 | 0.00 | 0.05 | 0.03 | ≥70 | ≥70 | G5 |
| Example 1 | (1) | 6.0 | 1.62 | 0.10 | 0.80 | 0.56 | ≥70 | ≥70 | G2 |
| Example 2 | (2) | 6.1 | 1.61 | 0.20 | 0.95 | 0.71 | ≥70 | ≥70 | G2 |
| Example 3 | (3) | 6.1 | 1.59 | 0.30 | 1.20 | 0.94 | ≥70 | ≥70 | G1 |
| Example 4 | (4) | 6.0 | 1.60 | 0.40 | 1.50 | 1.19 | ≥70 | ≥70 | G2 |
| Comparative example 2 | (C2) | 6.2 | 1.61 | 0.50 | 1.93 | 1.51 | ≥70 | ≥70 | G4 |
| Example 5 | (5) | 6.0 | 1.60 | 0.10 | 0.72 | 0.51 | 0 | 0 | G3 |

Measurement of Domains in Toner Particles

The domains included in the toner particles are measured in accordance with the method described above. The toner prepared in Example 5 does not include either the first or second toner particles.

Mixing of Toner and Carrier

The toner (5) and the carrier (M) are charged into a V-blender at a mass ratio of Toner(5):Carrier(M)=5:95. The resulting mixture is stirred for 20 minutes to form a developer (5).

Developer Performance Evaluation

Transfer Quality

A modification machine of an image forming apparatus "DocuCenterColor400" produced by Fuji Xerox Co., Ltd. is prepared. A specific one of the developers is charged into the developing device, which is then left to stand at a temperature of 24° C. and a relative humidity of 50% for 1 day.

As a recording medium, embossed paper "LEATHAC 66, 203GSM" produced by Tokushu Tokai Paper Co., Ltd. is prepared and left to stand at a temperature of 28° C. and a relative humidity of 85% for 1 day in order to perform moisture conditioning.

A rectangle patch image is formed on 10 sheets of the moisture-conditioned embossed paper at a temperature of 24° C. and a relative humidity of 50% so as to have an area coverage of 1%. The image formed on the 10th sheet is visually inspected. The degrees of transfer quality are classified as described below. G1 and G2 are ranges acceptable in the practical applications.

G1: Color missing is absent in the recesses of the embossed paper sheet.

G2: Color missing is present in the recesses of the embossed paper sheet in an amount less than 5% of the area of the image.

Examples 101 to 129

Toner particles (101) to (129) are prepared as in the preparation of the toner particles (1), except that the type of the release agent used, the amount of the resin particle dispersion liquid used in the second aggregated particle formation step, the amount of the resin particle dispersion liquid used in the third aggregated particle formation step, and the fusion coalescence step are adjusted such that the crystalline resin domains and the release agent domains included in the toner particles have the properties described in Tables 3 and 4. The cooling rate at which the first cooling is performed in the fusion coalescence step, the temperature at which holding is performed subsequent to reheating in the fusion coalescence step, and the cooling rate at which the second cooling is performed in the fusion coalescence step are set as described in Table 2.

Toners (101) to (129) and developers (101) to (129) are prepared as in the preparation of the toner (1) and the developer (1), except that a specific one of the toner particle samples (101) to (129) is used instead of the toner particles (1).

Using each of the toners (101) to (129) as an sample, a qualitative and quantitative elemental analysis is conducted with an X-ray analyzer "ZSX Primus II" produced by Rigaku Corporation in order to determine the Net intensities (unit: kcps) of Ca, Mg, and Cl elements. The Net intensities $N_{Ca}$ of a Ca element in the toners prepared in Examples 101 to 129 are 1.00 kcps or more and 3.00 kcps or less. The Net intensities $N_{Mg}$ of an Mg element in the toners prepared in Examples 101 to 129 are 0.10 kcps or more and 0.40 kcps or less. The Net intensities $N_{Cl}$ of a Cl element in the toners prepared in Examples 101 to 129 are 0.50 kcps or more and 2.00 kcps or less.

TABLE 2

|  | D50v of core aggregated particles (μm) | Cooling rate in first cooling | Holding temperature after reheating | Cooling rate in second cooling | D50v of final toner particles (μm) |
|---|---|---|---|---|---|
| Example 101 | 4.9 | 15° C./min | 80° C. | 0.5° C./min | 5.8 |
| Example 102 | 4.9 | 15° C./min | 92° C. | 0.5° C./min | 5.9 |
| Example 103 | 4.9 | 15° C./min | 80° C. | 0.5° C./min | 5.8 |
| Example 104 | 4.9 | 15° C./min | 80° C. | 0.5° C./min | 5.7 |
| Example 105 | 4.9 | 5° C./min | 92° C. | 1° C./min | 5.8 |
| Example 106 | 4.9 | 15° C./min | 92° C. | 1° C./min | 5.8 |
| Example 107 | 4.9 | 5° C./min | 92° C. | 0.5° C./min | 5.8 |
| Example 108 | 4.9 | 5° C./min | 80° C. | 1° C./min | 5.8 |
| Example 109 | 4.9 | 15° C./min | 80° C. | 1° C./min | 5.8 |
| Example 110 | 4.9 | 5° C./min | 80° C. | 0.5° C./min | 5.8 |
| Example 111 | 3.4 | 5° C./min | 92° C. | 1° C./min | 4.1 |
| Example 112 | 3.4 | 10° C./min | 92° C. | 1° C./min | 4.0 |
| Example 113 | 3.4 | 15° C./min | 92° C. | 1° C./min | 4.1 |
| Example 114 | 3.4 | 10° C./min | 92° C. | 1.5° C./min | 4.1 |
| Example 115 | 3.4 | 15° C./min | 92° C. | 1.5° C./min | 4.2 |
| Example 116 | 3.4 | 5° C./min | 80° C. | 1° C./min | 4.1 |
| Example 117 | 3.4 | 15° C./min | 80° C. | 1° C./min | 4.1 |
| Example 118 | 3.4 | 5° C./min | 80° C. | 0.5° C./min | 4.1 |
| Example 119 | 3.4 | 15° C./min | 80° C. | 0.5° C./min | 4.1 |
| Example 120 | 6.9 | 15° C./min | 92° C. | 1° C./min | 8.0 |
| Example 121 | 6.9 | 15° C./min | 92° C. | 0.7° C./min | 8.1 |
| Example 122 | 6.9 | 5° C./min | 92° C. | 0.3° C./min | 8.0 |
| Example 123 | 6.9 | 15° C./min | 92° C. | 0.3° C./min | 8.2 |
| Example 124 | 6.9 | 15° C./min | 80° C. | 1° C./min | 8.0 |
| Example 125 | 6.9 | 15° C./min | 80° C. | 0.7° C./min | 8.0 |
| Example 126 | 6.9 | 5° C./min | 80° C. | 0.3° C./min | 8.1 |
| Example 127 | 6.9 | 15° C./min | 80° C. | 0.3° C./min | 8.0 |
| Example 128 | 4.9 | 15° C./min | 80° C. | 15° C./min | 5.8 |
| Example 129 | — | 1° C./min | — | — | 5.8 |

TABLE 3

|  |  | Crystalline resin domain A | | | | Crystalline resin domain B | | | | Angle at which extensions of major axes of A and B intersect | Release agent domain | |
|---|---|---|---|---|---|---|---|---|---|---|---|---|
|  | D50v of toner particles μm | Aspect ratio AR | Major axis length $L_{cry}$ μm | Ratio of major axis length to maximum diameter of toner particle % | Angle formed by major axis and tangent $\theta_A$ degree | Aspect ratio AR | Major axis length $L_{cry}$ μm | Ratio of major axis length to maximum diameter of toner particle % | Angle formed by major axis and tangent $\theta_A$ degree | $\theta_B$ degree | Type | Shortest distance nm |
| Example 101 | 5.8 | 32 | 1.5 | 26 | 89 | 23 | 1.1 | 19 | 85 | 75 | Ester wax | 60 |
| Example 102 | 5.9 | 31 | 1.4 | 24 | 88 | 27 | 1.3 | 22 | 72 | 69 | Ester wax | 30 |
| Example 103 | 5.8 | 22 | 1.1 | 19 | 84 | 25 | 1.2 | 21 | 81 | 76 | Paraffin wax | 60 |
| Example 104 | 5.7 | 27 | 1.3 | 23 | 86 | 20 | 0.9 | 16 | 80 | 63 | Polyethylene wax | 70 |
| Example 105 | 5.8 | 17 | 0.8 | 14 | 85 | 13 | 0.6 | 10 | 75 | 77 | Ester wax | 20 |
| Example 106 | 5.8 | 19 | 0.9 | 16 | 80 | 15 | 0.7 | 12 | 76 | 83 | Ester wax | 30 |
| Example 107 | 5.8 | 32 | 1.5 | 26 | 88 | 23 | 1.2 | 21 | 82 | 75 | Ester wax | 30 |
| Example 108 | 5.8 | 14 | 0.7 | 12 | 88 | 17 | 0.8 | 14 | 77 | 53 | Ester wax | 60 |
| Example 109 | 5.8 | 13 | 0.6 | 10 | 80 | 19 | 0.9 | 16 | 69 | 82 | Ester wax | 70 |
| Example 110 | 5.8 | 21 | 1.0 | 17 | 86 | 27 | 1.3 | 22 | 80 | 61 | Ester wax | 50 |
| Example 111 | 4.1 | 16 | 0.7 | 17 | 87 | 11 | 0.5 | 12 | 76 | 48 | Ester wax | 20 |
| Example 112 | 4.0 | 13 | 0.6 | 15 | 82 | 17 | 0.8 | 20 | 80 | 67 | Ester wax | 20 |
| Example 113 | 4.1 | 27 | 1.3 | 32 | 88 | 22 | 1.1 | 27 | 73 | 82 | Ester wax | 20 |
| Example 114 | 4.1 | 10 | 0.4 | 10 | 83 | 11 | 0.5 | 12 | 72 | 52 | Ester wax | 20 |
| Example 115 | 4.2 | 5 | 0.3 | 7 | 86 | 9 | 0.4 | 10 | 81 | 73 | Ester wax | 20 |
| Example 116 | 4.1 | 23 | 0.5 | 12 | 88 | 20 | 0.7 | 17 | 75 | 76 | Ester wax | 60 |
| Example 117 | 4.1 | 20 | 0.8 | 20 | 86 | 30 | 0.5 | 12 | 82 | 81 | Ester wax | 60 |
| Example 118 | 4.1 | 27 | 1.3 | 32 | 82 | 29 | 1.4 | 34 | 73 | 69 | Ester wax | 60 |
| Example 119 | 4.1 | 22 | 1.4 | 34 | 87 | 26 | 1.1 | 27 | 80 | 72 | Ester wax | 60 |
| Example 120 | 8.0 | 10 | 0.5 | 6 | 88 | 15 | 0.6 | 8 | 75 | 73 | Ester wax | 40 |
| Example 121 | 8.1 | 20 | 1.0 | 12 | 86 | 9 | 0.5 | 6 | 79 | 69 | Ester wax | 40 |
| Example 122 | 8.0 | 38 | 1.8 | 23 | 82 | 29 | 1.4 | 18 | 76 | 76 | Ester wax | 40 |
| Example 123 | 8.2 | 31 | 1.5 | 18 | 85 | 36 | 1.7 | 21 | 80 | 53 | Ester wax | 40 |
| Example 124 | 8.0 | 14 | 0.6 | 8 | 83 | 25 | 0.5 | 6 | 81 | 64 | Ester wax | 60 |
| Example 125 | 8.0 | 22 | 1.1 | 14 | 84 | 17 | 0.8 | 10 | 76 | 73 | Ester wax | 60 |
| Example 126 | 8.1 | 38 | 1.8 | 22 | 85 | 35 | 1.7 | 21 | 68 | 68 | Ester wax | 60 |
| Example 127 | 8.0 | 33 | 1.6 | 20 | 86 | 34 | 1.7 | 21 | 72 | 82 | Ester wax | 60 |

TABLE 3-continued

| | | Crystalline resin domain A | | | | | Crystalline resin domain B | | | Angle at which extensions of major axes of A and B intersect each other $\theta_B$ degree | Release agent domain | |
|---|---|---|---|---|---|---|---|---|---|---|---|---|
| | D50v of toner particles μm | Aspect ratio AR | Major axis length $L_{cry}$ μm | Ratio of major axis length to maximum diameter of toner particle % | Angle formed by major axis and tangent $\theta_A$ degree | Aspect ratio AR | Major axis length $L_{cry}$ μm | Ratio of major axis length to maximum diameter of toner particle % | Angle formed by major axis and tangent $\theta_A$ degree | | Type | Shortest distance nm |
| Example 128 | 5.8 | 3 | 0.25 | 4 | 52 | 2 | 0.2 | 3 | 38 | 52 | Ester wax | 60 |
| Example 129 | 5.8 | 16 | 0.8 | 14 | 88 | 14 | 0.7 | 12 | 87 | 2 | Ester wax | 20 |

TABLE 4

Proportion of toner particles satisfying conditions (number %)

| | First toner particles A | First toner particles A satisfying Condition E | First toner particles B | First toner particles B satisfying Condition E | Second toner particles A | Second toner particles A satisfying Condition E | Second toner particles B | Second toner particles B satisfying Condition E | Evaluation Transfer quality |
|---|---|---|---|---|---|---|---|---|---|
| Example 101 | 94 | 87 | 77 | 73 | 92 | 83 | 76 | 72 | G1 |
| Example 102 | 81 | 0 | 75 | 0 | 78 | 0 | 70 | 0 | G2 |
| Example 103 | 82 | 75 | 74 | 70 | 79 | 74 | 73 | 71 | G2 |
| Example 104 | 86 | 83 | 76 | 73 | 83 | 79 | 74 | 70 | G2 |
| Example 105 | 37 | 0 | 26 | 0 | 34 | 0 | 24 | 0 | G2 |
| Example 106 | 47 | 0 | 35 | 0 | 42 | 0 | 32 | 0 | G2 |
| Example 107 | 77 | 0 | 53 | 0 | 72 | 0 | 47 | 0 | G1 |
| Example 108 | 27 | 26 | 18 | 18 | 25 | 24 | 16 | 15 | G2 |
| Example 109 | 51 | 50 | 37 | 35 | 43 | 40 | 29 | 25 | G2 |
| Example 110 | 72 | 65 | 48 | 44 | 67 | 61 | 45 | 41 | G1 |
| Example 111 | 28 | 0 | 22 | 0 | 38 | 0 | 31 | 0 | G2 |
| Example 112 | 51 | 0 | 43 | 0 | 63 | 0 | 52 | 0 | G2 |
| Example 113 | 72 | 0 | 67 | 0 | 84 | 0 | 73 | 0 | G1 |
| Example 114 | 0 | 0 | 0 | 0 | 44 | 0 | 31 | 0 | G2 |
| Example 115 | 7 | 0 | 9 | 0 | 54 | 0 | 42 | 0 | G2 |
| Example 116 | 37 | 34 | 26 | 24 | 38 | 35 | 27 | 25 | G2 |
| Example 117 | 48 | 43 | 40 | 34 | 52 | 47 | 35 | 29 | G2 |
| Example 118 | 75 | 72 | 63 | 59 | 75 | 72 | 63 | 59 | G1 |
| Example 119 | 83 | 79 | 76 | 71 | 83 | 79 | 76 | 71 | G1 |
| Example 120 | 49 | 0 | 42 | 0 | 7 | 0 | 3 | 0 | G2 |
| Example 121 | 48 | 0 | 43 | 0 | 52 | 0 | 48 | 0 | G2 |
| Example 122 | 68 | 0 | 64 | 0 | 74 | 0 | 71 | 0 | G2 |
| Example 123 | 81 | 0 | 74 | 0 | 85 | 0 | 81 | 0 | G2 |
| Example 124 | 48 | 41 | 45 | 42 | 6 | 6 | 2 | 2 | G2 |
| Example 125 | 52 | 44 | 43 | 41 | 51 | 48 | 46 | 43 | G1 |
| Example 126 | 68 | 64 | 60 | 56 | 76 | 73 | 71 | 66 | G1 |
| Example 127 | 79 | 77 | 71 | 69 | 86 | 82 | 79 | 75 | G1 |
| Example 128 | 0 | 0 | 0 | 0 | 0 | 0 | 0 | 0 | G3 |
| Example 129 | 0 | 0 | 0 | 0 | 0 | 0 | 0 | 0 | G3 |

The symbols and the like used in Tables 3 and 4 mean the following items.

First toner particles A: toner particles that satisfy the conditions (A), (B1), (C), and (D).

First toner particles B: toner particles that satisfy the conditions (A'), (B1'), (C'), and (D').

Condition (A'): the crystalline resin domain has an aspect ratio of 10 or more and 40 or less.

Condition (B1'): the crystalline resin domain has a major axis length of 0.8 μm or more and 1.5 μm or less.

Condition (C'): the angle formed by an extension of the major axis of the crystalline resin domain and a tangent to the surface of the toner particle at a point at which the extension intersects the surface of the toner particle is 750 or more and 90° or less.

Condition (D'): the angle at which extensions of the major axes of two crystalline resin domains intersect each other is 600 or more and 90° or less.

Second toner particles A: toner particles that satisfy the conditions (A), (B2), (C), and (D).

Second toner particles B: toner particles that satisfy the conditions (A'), (B2'), (C'), and (D').

Condition (A'): the crystalline resin domain has an aspect ratio of 10 or more and 40 or less.

Condition (B2'): the ratio of the major axis length of the crystalline resin domain to the maximum diameter of the toner particle is 13% or more and 30% or less.

Condition (C'): the angle formed by an extension of the major axis of the crystalline resin domain and a tangent to the surface of the toner particle at a point at which the extension intersects the surface of the toner particle is 750 or more and 90° or less.

Condition (D'): the angle at which extensions of the major axes of two crystalline resin domains intersect each other is 600 or more and 90° or less.

AR: the aspect ratio of the crystalline resin domain $L_{Cry}$: the major axis length of the crystalline resin domain $\theta_A$: the angle formed by an extension of the major axis of the crystalline resin domain and a tangent to surface of the toner particle at a point at which the extension intersects the surface of the toner particle $\theta_3$: the angle at which extensions of the major axes of two crystalline resin domains intersect each other Shortest distance: the shortest distance between the release agent domain and the surface (i.e., outer periphery) of a toner particle Ester wax: "WEP-5" produced by NOF CORPORATION, melting temperature: 85° C.

Paraffin wax: "HNP-0190" produced by Nippon Seiro Co., Ltd., melting temperature: 89° C.

Polyethylene wax: melting temperature: 89° C.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developing toner comprising:
    an amorphous polyester resin;
    a crystalline polyester resin; and
    C.I. Pigment Red 57:1,
    wherein a Net intensity $N_{Mg}$ of an Mg element, the Net intensity $N_{Mg}$ being determined by X-ray fluorescence analysis, is 0.10 kcps or more and 0.40 kcps or less, and
    wherein a Net intensity $N_{Ca}$ of a Ca element, the Net intensity $N_{Mg}$ of the Mg element, and a Net intensity $N_{Cl}$ of a Cl element, the Net intensities $N_{Ca}$, $N_{Mg}$, and $N_{Cl}$ being determined by X-ray fluorescence analysis, satisfy $0.50 \leq (N_{Mg}+N_{Cl})/N_{Ca} \leq 1.50$,
    wherein the electrostatic image developing toner comprising a toner particle including at least two crystalline resin domains satisfying conditions (A), (B1), (C), and (D) below when a cross section of the toner particle is observed,
    Condition (A) that each of the crystalline resin domains has an aspect ratio of 5 or more and 40 or less,
    Condition (B1) that each of the crystalline resin domains has a major axis length of 0.5 µm or more and 1.5 µm or less,
    Condition (C) that an angle formed by an extension of a major axis of each of the crystalline resin domains and a tangent to a surface of the toner particle at a point at which the extension intersects the surface of the toner particle is 60° or more and 90° or less,
    Condition (D) that an angle at which extensions of major axes of two of the crystalline resin domains intersect each other is 45° or more and 90° or less.

2. The electrostatic image developing toner according to claim 1,
    wherein the Net intensity $N_{Mg}$ is 0.15 kcps or more and 0.35 kcps or less.

3. The electrostatic image developing toner according to claim 1,
    wherein a Net intensity $N_{Ca}$ of a Ca element, the Net intensity $N_{Ca}$ being determined by X-ray fluorescence analysis, is 1.00 kcps or more and 3.00 kcps or less.

4. The electrostatic image developing toner according to claim 2,
    wherein a Net intensity $N_{Ca}$ of a Ca element, the Net intensity $N_{Ca}$ being determined by X-ray fluorescence analysis, is 1.00 kcps or more and 3.00 kcps or less.

5. The electrostatic image developing toner according to claim 3,
    wherein the Net intensity $N_{Ca}$ is 1.20 kcps or more and 2.50 kcps or less.

6. The electrostatic image developing toner according to claim 1,
    wherein a Net intensity $N_{Cl}$ of a Cl element, the Net intensity $N_{Cl}$ being determined by X-ray fluorescence analysis, is 0.50 kcps or more and 2.00 kcps or less.

7. The electrostatic image developing toner according to claim 6,
    wherein the Net intensity No is 0.70 kcps or more and 1.80 kcps or less.

8. The electrostatic image developing toner according to claim 1,
    wherein the Net intensities $N_{Ca}$, $N_{Mg}$, and $N_{Cl}$ satisfy $0.80 \leq (N_{Mg}+N_{Cl})/N_{Ca} \leq 1.30$.

9. The electrostatic image developing toner according to claim 1,
    the electrostatic image developing toner further comprising a release agent,
    the release agent including an ester of a higher fatty acid having 10 to 25 carbon atoms with a monohydric or polyhydric alcohol.

10. The electrostatic image developing toner according to claim 1,
    the electrostatic image developing toner comprising a toner particle including at least two crystalline resin domains satisfying conditions (A), (B2), (C), and (D) below when a cross section of the toner particle is observed,
    Condition (A) that each of the crystalline resin domains has an aspect ratio of 5 or more and 40 or less,
    Condition (B2) that a ratio of a major axis length of at least one of the crystalline resin domains to a maximum diameter of the toner particle is 10% or more and 30% or less,
    Condition (C) that an angle formed by an extension of a major axis of each of the crystalline resin domains and a tangent to a surface of the toner particle at a point at which the extension intersects the surface of the toner particle is 60° or more and 90° or less,
    Condition (D) that an angle at which extensions of major axes of two of the crystalline resin domains intersect each other is 45° or more and 90° or less.

11. The electrostatic image developing toner according to claim 1,
    wherein the toner particle includes a release agent, and
    wherein, when a cross section of the toner particle is observed, a domain composed of the release agent is present at a position 50 nm or more below the surface of the toner particle.

12. The electrostatic image developing toner according to claim 1,
    wherein a proportion of the toner particle to the entire toner particles is 40% or more by number.

13. The electrostatic image developing toner according to claim 12,
wherein the proportion of the toner particle to the entire toner particles is 70% or more by number.

14. An electrostatic image developer comprising the electrostatic image developing toner according to claim 1.

15. A toner cartridge detachably attachable to an image forming apparatus, the toner cartridge comprising the electrostatic image developing toner according to claim 1.

16. A process cartridge detachably attachable to an image forming apparatus, the process cartridge comprising a developing unit that includes the electrostatic image developer according to claim 14 and develops an electrostatic image formed on a surface of an image holding member with the electrostatic image developer to form a toner image.

17. An image forming apparatus comprising:
an image holding member;
a charging unit that charges a surface of the image holding member;
an electrostatic image formation unit that forms an electrostatic image on the charged surface of the image holding member;
developing unit that includes the electrostatic image developer according to claim 14 and develops the electrostatic image formed on the surface of the image holding member with the electrostatic image developer to form a toner image;
a transfer unit that transfers the toner image formed on the surface of the image holding member onto a surface of a recording medium; and
a fixing unit that fixes the toner image transferred on the surface of the recording medium.

18. An image forming method comprising:
charging a surface of an image holding member;
forming an electrostatic image on the charged surface of the image holding member;
developing the electrostatic image formed on the surface of the image holding member with the electrostatic image developer according to claim 14 to form a toner image;
transferring the toner image formed on the surface of the image holding member onto a surface of a recording medium; and
fixing the toner image transferred on the surface of the recording medium.

* * * * *